United States Patent
Evans et al.

(10) Patent No.: US 7,831,239 B2
(45) Date of Patent: Nov. 9, 2010

(54) MAILBOX ANSWERPHONE SERVICE FOR MOBILE COMMUNICATIONS

(75) Inventors: Lester Andrew Evans, Cheltenham (GB); Neil Chapman, Bristol (GB)

(73) Assignee: France Telecom, Paris (FR)

( * ) Notice: Subject to any disclaimer, the term of this patent is extended or adjusted under 35 U.S.C. 154(b) by 555 days.

(21) Appl. No.: 11/589,418

(22) Filed: Oct. 30, 2006

(65) Prior Publication Data

US 2007/0049254 A1   Mar. 1, 2007

Related U.S. Application Data (62) Division of application No. 09/555,951, filed as application No. PCT/GB98/03622 on Dec. 4, 1998, now Pat. No. 7,139,552.

(51) Int. Cl.
*H04L 12/58* (2006.01)
*H04B 7/216* (2006.01)

(52) U.S. Cl. .................... 455/412.1; 370/342
(58) Field of Classification Search ............. 455/412, 455/412.1
See application file for complete search history.

(56) References Cited

U.S. PATENT DOCUMENTS

| | | | | |
|---|---|---|---|---|
| 4,682,351 | A | 7/1987 | Makino | 455/463 |
| 4,964,156 | A | 10/1990 | Blair | 379/88.12 |
| 5,475,735 | A | 12/1995 | Williams et al. | 455/403 |
| 5,497,373 | A | 3/1996 | Hulen et al. | 379/88.13 |
| 5,539,810 | A | 7/1996 | Kennedy et al. | 340/431 |
| 5,548,636 | A | 8/1996 | Bannister et al. | 379/390.01 |
| 5,646,986 | A | 7/1997 | Sahni et al. | 379/221.07 |
| 5,659,599 | A * | 8/1997 | Arumainayagam et al. | 379/67.1 |
| 5,711,011 | A | 1/1998 | Urs et al. | 379/88.25 |
| 5,838,772 | A | 11/1998 | Wilson et al. | 379/88.19 |
| 5,839,064 | A * | 11/1998 | Foti | 455/413 |
| 5,889,839 | A | 3/1999 | Beyda et al. | 379/88.22 |
| 5,946,386 | A * | 8/1999 | Rogers et al. | 379/265.09 |
| 5,987,317 | A | 11/1999 | Venturini | 379/88.25 |
| 6,069,888 | A * | 5/2000 | LaRocca | 370/342 |
| 6,122,510 | A * | 9/2000 | Granberg | 455/433 |
| 6,203,192 | B1 | 3/2001 | Fortman | 379/106.09 |

(Continued)

FOREIGN PATENT DOCUMENTS

EP   0 588 101 A   3/1994

(Continued)

OTHER PUBLICATIONS

International Preliminary Examination Report for PCT/GB98/03622.

*Primary Examiner*—Lester Kincaid
*Assistant Examiner*—Yu (Andy) Gu
(74) *Attorney, Agent, or Firm*—Knobbe Martens Olson & Bear LLP (57) ABSTRACT

An apparatus for use in a mobile communications system is provided. The apparatus is adapted to store messages for subsequent retrieval by a subscriber of the mobile communications system. The apparatus is further adapted to identify a first subscriber making a call to retrieve a message by using an identification signal automatically forwarded to the apparatus during call establishment. The signal may identify the equipment being used by the subscriber. The apparatus may be further adapted to identify a second subscriber, on receipt of a request from the second subscriber during the call, by using information supplied by the second subscriber during the call.

18 Claims, 5 Drawing Sheets

U.S. PATENT DOCUMENTS 6,333,973 B1 12/2001 Smith et al. ............ 379/67.1

FOREIGN PATENT DOCUMENTS

| EP | 0 631 452 A | 12/1994 |
| GB | 2 303 761 A | 2/1997 |
| WO | WO 91/03900 | 3/1991 |
| WO | WO 93/13518 | 7/1993 |

* cited by examiner

MAILBOX ANSWERPHONE SERVICE FOR MOBILE COMMUNICATIONS

CROSS REFERENCE TO RELATED APPLICATIONS

This application is a divisional application of U.S. application Ser. No. 09/555,951, filed Sep. 5, 2000 (now U.S. Pat. No. 7,139,552), which is a national phase application of International Application No. PCT/GB98/03622, filed Dec. 4, 1998 (published as WO99/30475), which claims priority to GB 9725866.9, filed on Dec. 5, 1997. The subject matter of U.S. application Ser. No. 09/555,951 is expressly incorporated by reference herein in its entirety.

BACKGROUND OF THE INVENTION

1. Field of the Invention

This invention relates to mobile communications, and more particularly but not exclusively to apparatus for use in a mobile communications system such as a GSM (Global System for Mobile communications) digital cellular radio network, and to a method of providing a message service to a user of such a mobile communications system.

2. Description of the Related Art

Figure 1:
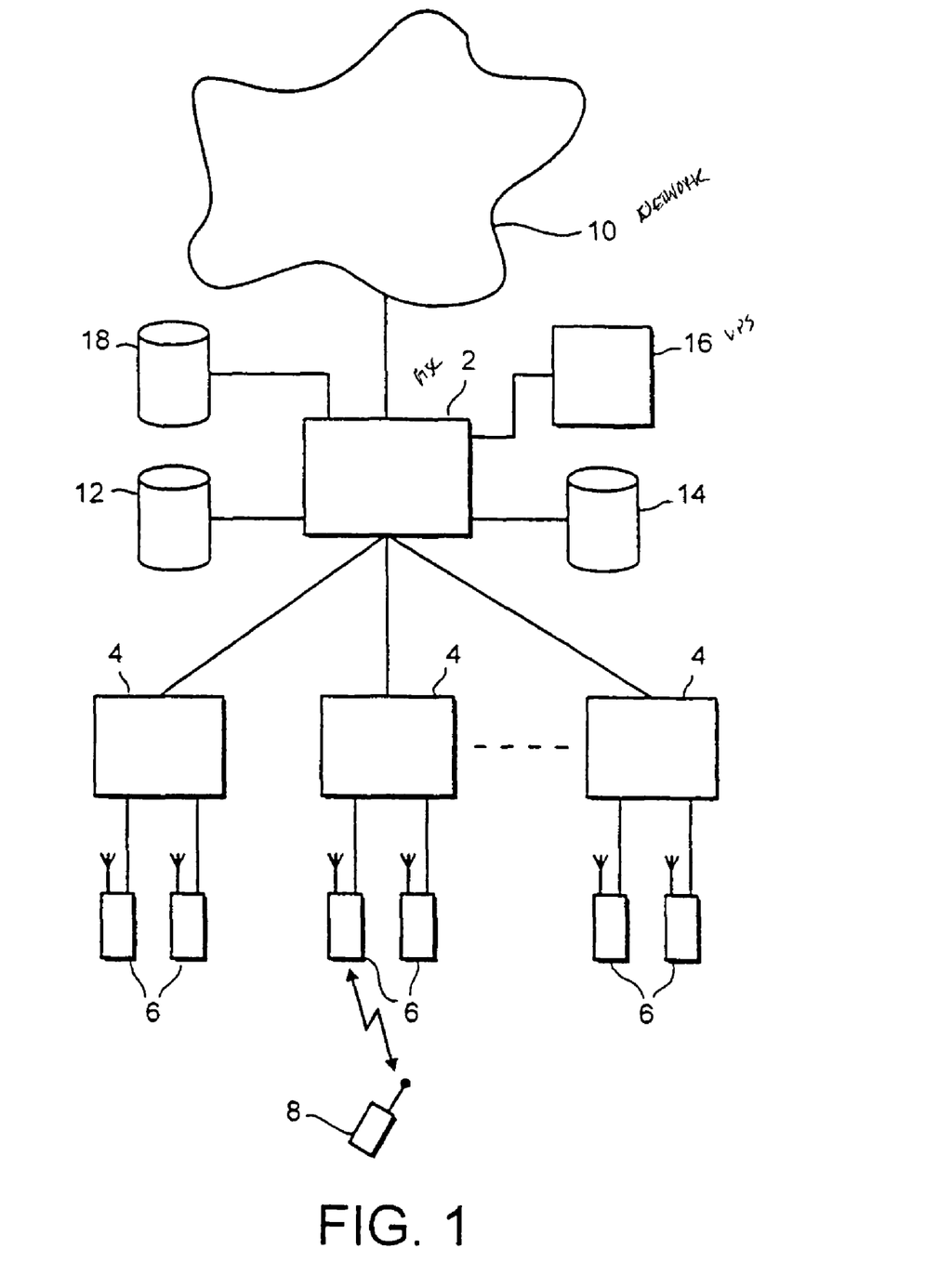
FIG. 1 is a block diagram of a mobile communications network.

A conventional GSM network is schematically illustrated in FIG. 1. A mobile switching centre (MSC) 2 is connected via communication links to a number of base station controller (BSCs) 4. The BSCs 4 are dispersed geographically across areas served by the mobile switching centre 2. Each BSC 4 controls one or more base transceiver stations (BTSs) 6 located remote from, and connected by further communication links to, the BSC 4. Each BTS 6 transmits radio signals to, and receives radio signals from, mobile stations 8 which are in an area served by that BTS 6. That area is referred to as a "cell". A GSM network is provided with a large number of such cells, which are ideally contiguous to provide continuous coverage over the whole network territory.

A mobile switching centre 2 is also connected via communication links to other mobile switching centers in the remainder of the mobile communications system 10, and to a public service telephone network (PSTN), which is not illustrated. The mobile switching centre 2 is provided with a home location register (HLR) 12 which is a database storing subscriber authentication data including the international mobile subscriber identity (IMSI) which is unique to each mobile station 8. The IMSI is also stored in the mobile station in a subscriber identity module (SIM) along with other subscriber-specific information.

The mobile switching centre 2 is also provided with a visitor location register (VLR) 14 which is a database temporarily storing subscriber authentication data for mobile stations which are active in the area served by the mobile switching centre 2.

The mobile switching centre 2 may also be provided with a subscriber location register (SLR) 18 which is a database storing data relating the HLRs and VPSs of the network with the network's subscribers.

The GSM network supports a variety of services. One such service is an answerphone service. The answerphone service, among other services, is implemented on a Voice Processing System (VPS) 16. The VPS 16 is linked to the mobile switching centre 2. Incoming calls to the MSC 2 which are not answered by a called subscriber are automatically forwarded to the VPS 16. FIG. 1 only illustrates a single VPS 16. However, a mobile communications network generally comprises several VPSs 16 each serving a plurality of subscribers. Various implementations of the answerphone service are possible, of which one example is described below.

In the implementation which this invention concerns, the answerphone service is accessed by means of one or more directory numbers which may be called by all, or at least a plurality of, subscribers, and possibly non-subscribers, to access the service (hereinafter referred to as "common telephone numbers of the answerphone service"). For a subscriber, the common number may be dialed manually, or generated by the handset itself on the subscriber pressing a "dial answerphone option".

In other implementations, each subscriber is provided with two directory numbers, one identifying the subscriber's handset and the other identifying the subscriber's mailbox. If a call is made to the number identifying the subscribers mailbox, the subscriber is allowed to access their messages, if any, sometimes subject to entry of a personal PIN code for the subscriber.

The answerphone service provides a personal mailbox for each subscriber to the answerphone service. When a call is forwarded to a subscriber's mailbox, a personal message of the subscriber is played to the caller. The caller may then leave a voice message in the mailbox. The subscriber is notified by a GSM short message that a message has been deposited in the subscriber's mailbox. The subscriber can then access his/her mailbox in order to retrieve the message.

A call to the subscriber which is not answered is automatically forwarded to the answerphone service and the called subscriber's telephone number is used to access the subscriber's mailbox. However, a call to the subscriber may not only be forwarded if the called subscriber is busy, out of coverage or does not answer, but also if the subscriber's elects, via an option on the handset, to have the call forwarded to his mailbox. Such a call is referred to as a conditionally diverted call. The subscriber can elect which calls, i.e. the calls from which callers, are to be diverted. The subscriber sets on the handset a telephone number where a call is to be diverted to. That telephone number may be a telephone number which subscribers commonly use to access the answerphone service.

The directory number (MSISDN) of the subscriber to which the call is directed is transmitted as the CLI (calling line identity) on diversion of a call from the subscriber's handset. The CLI, being unique for each subscriber, can be used by the VPS to access the subscriber's mailbox.

If a subscriber wants to access the answerphone service in order to retrieve a message from his/her mailbox, the subscriber dials the common telephone number of the answerphone service on his/her handset. The retrieval call can be automatically forwarded to the subscriber's mailbox by using the CLI. An incoming retrieval call can be distinguished from a conditionally diverted call by the lack of a divert flag which is set on diversion and transmitted to the answerphone service.

If a subscriber wants to access his/her mailbox from abroad, i.e. outside the coverage area of the home network (referred to as a "roaming" subscriber), the call is directed to the answerphone service via the visited network. However, no CLI is transmitted and the subscriber is not forwarded automatically to his/her mailbox. Rather, the mailbox number has to be entered manually to identify the mailbox from which a call is to be retrieved.

SUMMARY OF CERTAIN INVENTIVE ASPECTS

According to one aspect of the present invention, there is provided a method of providing a mailbox answerphone service to a caller in a mobile communications system during a call directed to a directory number used commonly by different ones of the system's subscribers to access their mailboxes, wherein said answerphone service identifies a mailbox associated with a subscriber by means of an identification code, said method comprising: entering either a first mode of answerphone operation or a second, different, mode of answerphone operation in dependence on information received during call establishment indicating whether said call is of international origin.

If a subscriber is roaming, a conditionally diverted call is forwarded to the home network via a visited network using the common number for the answerphone service.

Using the present invention, a conditionally diverted call of international origin can be distinguished from an international retrieval call even though the visited network may not transmit a divert flag. In an embodiment of the invention, an incoming international conditionally diverted call may initially automatically be treated in the same manner as an incoming international retrieval call, the caller may enter an indicator when message deposit is desired or vice-versa.

The CLI is generally lost when a call originating in a visited network is transmitted to the home network. Accordingly, though a diverted call is forwarded to the answerphone service using the international diversion number, the subscriber's mailbox cannot be accessed automatically by the VPS without the CLI. With an embodiment of the present invention, the user enters the required identification code for the VPS to access the subscriber's mailbox.

According to a further aspect of the invention there is provided a method of providing a mailbox answerphone service to a caller in a mobile communications system, wherein said answerphone service identifies a mailbox associated with a subscriber by means of an identification code, said method comprising: receiving a call from a mobile handset, said call being directed to a directory number used commonly by different subscribers to access their mailboxes; allowing said caller to input a selection indicator during said call; and (a) if said indicator is not received, detecting a first identification code associated with said mobile handset from information received during call establishment and providing a message retrieve service to allow the caller to retrieve messages from the mailbox associated with said first identification code, or (b) if said indicator is received, allowing the user to input a second identification code and providing a message retrieve service to allow the caller to retrieve messages from the mailbox associated with said second identification code.

A subscriber is thus able to use another subscriber's handset to retrieve a message from his/her mailbox, whilst the retrieval call is otherwise automatically forwarded to the mailbox associated with the subscriber of the used handset.

BRIEF DESCRIPTION OF THE DRAWINGS

An embodiment of the present invention will now be described, by way of example only, with reference to the accompanying drawings in which.

DETAILED DESCRIPTION OF CERTAIN INVENTIVE EMBODIMENTS

FIG. 1 shows a conventional mobile communications network. The mobile communications network is described in detail hereinabove and will not be repeated. The answerphone service and the service module in accordance with the embodiment of the present invention are implemented on the VPS 16. However, alternatively, the service module may also be provided outside the VPS 16 as a separate station with links to the VPS 16 and the MSC2.

Figure 2:
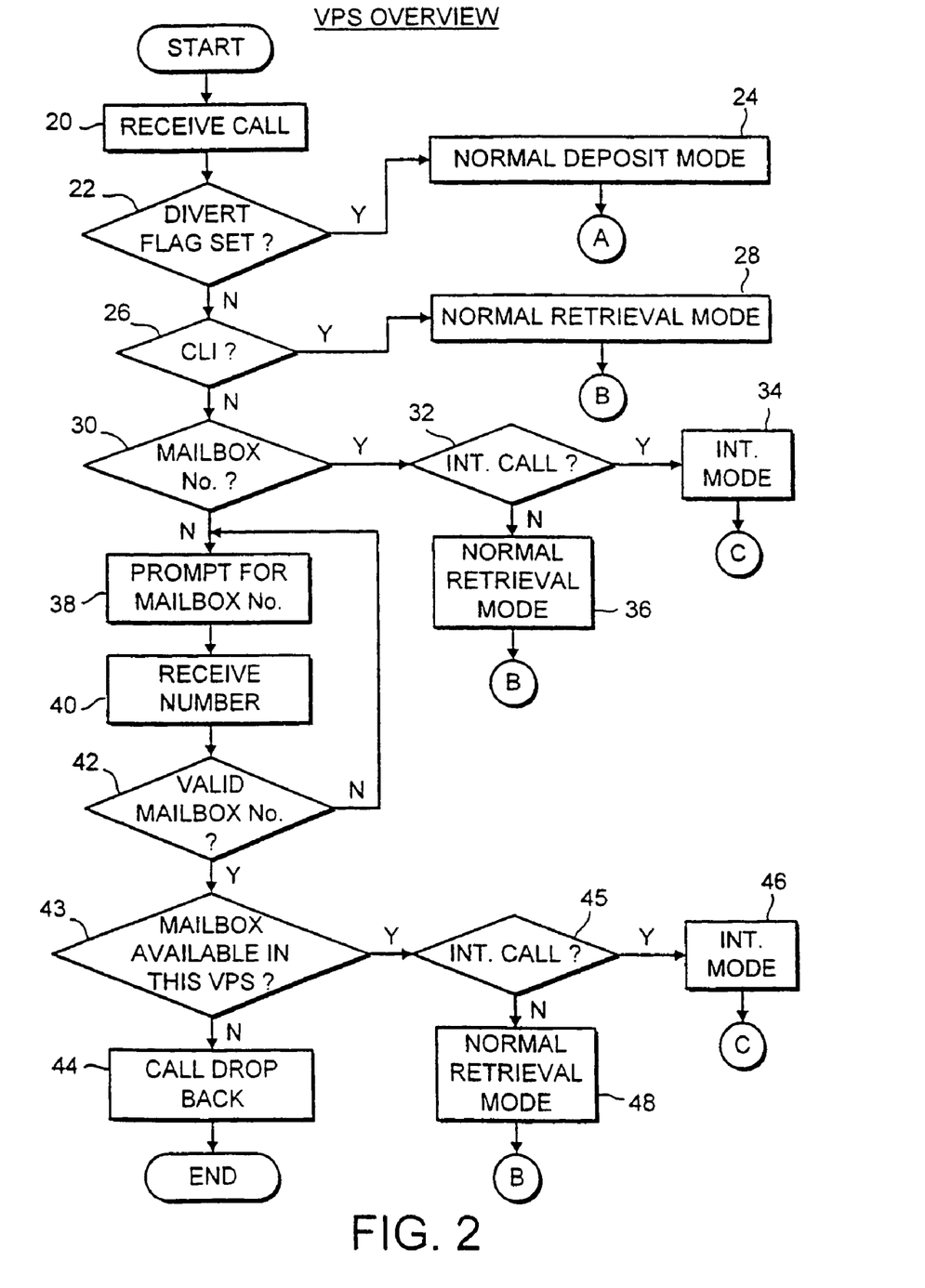
FIG. 2 is flow diagram showing an overview of steps taken by a VPS when receiving a call in accordance with the embodiment of the present invention.

FIG. 2 illustrates the steps taken by the service module in the VPS 16 when processing a call directed to a common telephone number of the answerphone service. After a call is received in step 20, the service module checks in step 22 whether the incoming call is a diverted call, i.e. whether a divert flag in the communications protocol from the MSC 2 is set. Such information is generally only available in the signaling associated with a call if the subscriber uses his/her handset within the home network area, i.e. if the subscriber's handset communications with the MSC 2 via the BTSs 6 and the BSCs 4 rather than via a visited network. In the case of a set divert flag, the service module proceeds to the normal deposit mode in step 24 as is described herein below in connection with FIG. 3. If the divert is not set, the service module checks in step 26 whether the incoming call is provided with the CLI information. If this is the case, it can be assumed that the caller is a subscriber who calls from inside the home network (the CLI is not passed over the international interconnect signaling links) and wishes to retrieve a message from the answerphone service. Accordingly, the service module proceeds to the normal retrieval mode at step 28 which is described in connection with FIG. 4, identifying the mailbox from the subscriber's CLI.

If the CLI is not present, the service module checks in step 30 whether the number of the mailbox (the directory number of the subscriber having the mailbox) to be accessed is known. This may be the case if the mailbox number was previously entered by the caller (a procedure to be described below) and the call subsequently is diverted to another VPS due to a call drop back. This is because, in this embodiment, a single VPS does not provide the answerphone for all subscribers. Rather, each of a plurality of VPSs provides the answerphone for a subset of all subscribers. In a situation where a call is forwarded to a VPS to be proceeded to the answerphone service although the mailbox to be accessed is managed by another VPS, the current VPS identifies the correct VPS via the SLR 18 and MSC 2 and redirects the call to the correct VPS, appending the mailbox number to the destination address, the routing number of the correct VPS forming the prefix of that address. Situations where a call drop back may occur are described hereinafter.

Accordingly, in the case of a call drop back, the mailbox number is contained in the destination address specified in signaling associated with the call. In this case, the service module proceeds to step 32 and checks whether the caller is abroad, i.e. whether the signaling associated with the call indicates a call of international origin. An international call is then processed in the international mode at step 34, whereas a national call is processed in the normal retrieval mode at step 36. The service module proceeds the call to step 36 if a call by a subscriber to the common number of the answerphone service from a national phone other than his/her handset, and for which the CLI is unavailable, is redirected to another VPS due to a call drop back.

If no mailbox number is detected in step 30, the service module generates a prompt in step 38 for the caller to enter into his/her telephone the number of the mailbox to be accessed. There are three types of incoming calls that are processed in step 38. The first type is a call originated abroad to the common number of the answerphone service from a subscriber who wishes to retrieve a message from the answerphone service. The second type is a call to a subscriber abroad, which call is diverted to the answerphone service via a visited network which does not pass the divert flag or provide the CLI in the signaling sent over the interconnect links. The third type is a call to the common number of the answerphone service of national origin from a subscriber using a phone other than his/her handset, and for which the CLI is unavailable, first being processed by a VPS.

After reception of a number which has been entered by the caller into his/her telephone in step 40, the service module checks in step 42 whether the entered number is a valid mailbox number. If no valid mailbox number has been entered, the service module returns to step 38. Otherwise, the service module proceeds to step 43 and checks whether the mailbox corresponding to the entered mailbox number is managed by a different VPS and, in that case, causes a call drop back at step 44. If the mailbox is managed by the same VPS, the origin (whether international or national) of the call is checked by determining whether the international origin flag is set in the signaling associated with the call, step 45. If the call is of international origin, the call is processed in international mode, step 46. Otherwise, the call is processed in normal retrieval mode, step 48.

Figure 3:
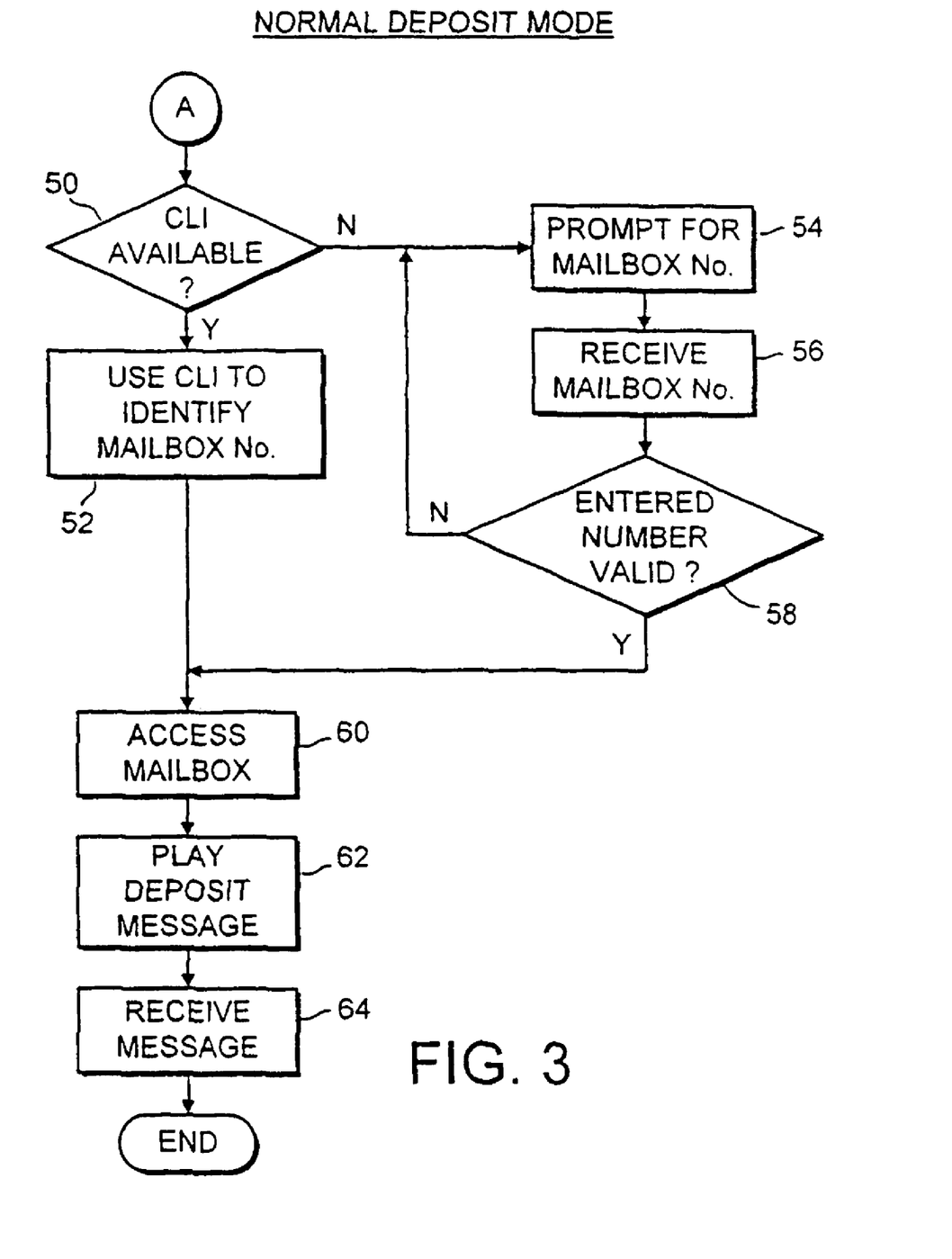
FIG. 3 is a flow diagram showing steps taken by a VPS when in a normal deposit mode in accordance with the embodiment of the present invention.

FIG. 3 shows the steps taken by the service module in the normal deposit mode. A set divert flag at step 22 in FIG. 2 indicates that a call has arrived at a subscriber's handset within the home network area but has subsequently been diverted to the VPS. However, the subscriber's CLI is not necessarily available since the subscriber has the option to preset his/her handset not to transmit the CLI. Accordingly, the service module checks in step 50 whether the CLI is available. If the CLI is available; the CLI is used in step 52 to identify the subscriber's mailbox number. If no CLI is available, the service module prompts the caller in step 54 to enter the mailbox number, receives the mailbox number in step 56 and verifies in step 58 whether a valid number has been entered. The identified/entered mailbox number is used to access the subscriber's mailbox in step 60. The service module then plays a personal deposit message by the subscriber to the caller in step 62 and receives a voice message from the caller in step 64.

Figure 4:
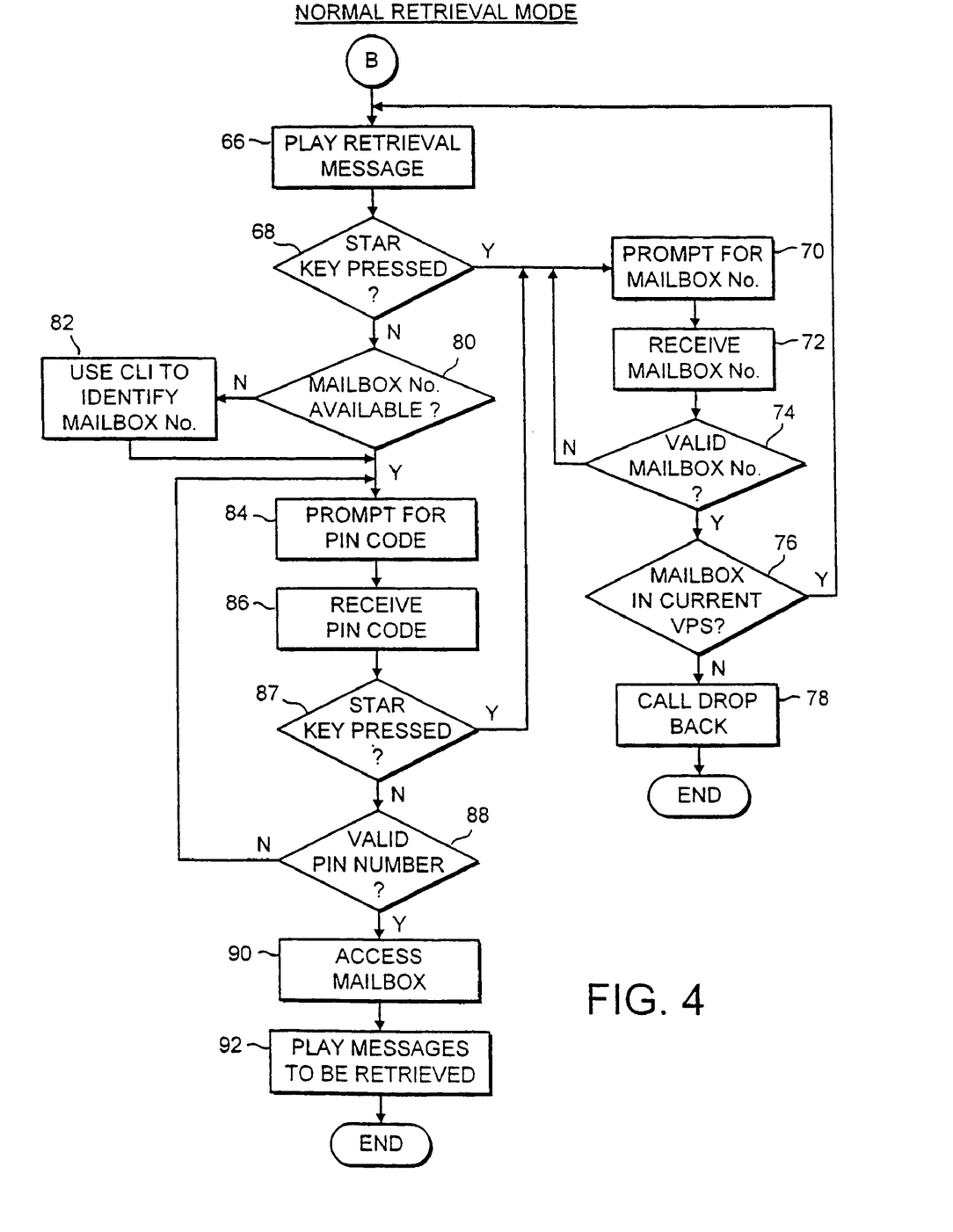
FIG. 4 is a flow diagram showing steps taken by a VPS when in a normal retrieve mode in accordance with the embodiment of the present invention.

FIG. 4 shows the steps taken by the service module in the normal retrieval mode. The service module proceeds to the normal retrieval in three cases. The first and second case are shown in FIG. 2. In the first case, the received call is not diverted and is provided with the CLI, this being the directory number of the handset from which the call is made. Accordingly, in this case, the call has a national origin and is directed to a common telephone number of the answerphone service. The second case results if a subscriber has entered his/her mailbox number to access his/her mailbox via a national telephone call to a common telephone number of the answerphone service from a telephone other than his/her handset.

The normal retrieval mode starts with the playing of a retrieval message to the caller in step 66. The retrieval message may comprise a retrieval message which allows the user to select from various services such as the retrieval of particular ones of the messages on a subscriber's mailbox, the dele- tion of messages, etc. If the star key of the caller's telephone is pressed during the playing of the retrieval message as indicated at step 68, the service module proceeds to step 70 and prompts the user to enter a mailbox number (the directory number of the subscriber having the mailbox) which is desired to be accessed. The service module receives a number in step 72 and checks in step 74 whether the entered number is a valid mailbox number. If the entered number is invalid, the service module returns to step 70. Otherwise, it checks in step 76 whether the mailbox associated with the entered mailbox number is provided in the current or in a different VPS. In the former case, the service module returns to step 66. In the latter case, the service module initiates a call drop back in step 78.

If the star key has not been pressed in step 68, the service module checks in step 80 whether a mailbox number is available. Only if no mailbox number is available, the CLI (the directory number associated with the handset being used) is used to obtain the mailbox number in step 82. This is to prevent that a wrong mailbox is accessed if a subscriber uses another subscriber's handset to access his/her mailbox, namely the mailbox associated with the CLI and not the mailbox associated with an entered mailbox number. In step 84, the service module prompts the caller to enter a PIN code in order to get authorized access to a mailbox. The PIN code is received in step 86. If the star key is pressed at this stage in step 87, the service module proceeds to step 70. Otherwise, the entered PIN code is checked for validity in step 88. Step 84 is repeated if the entered PIN code is invalid, whereas the mailbox is accessed in step 90 on entry of a valid PIN code. The service module then proceeds to step 92 and plays the message to be retrieved to the calling subscriber.

Figure 5:
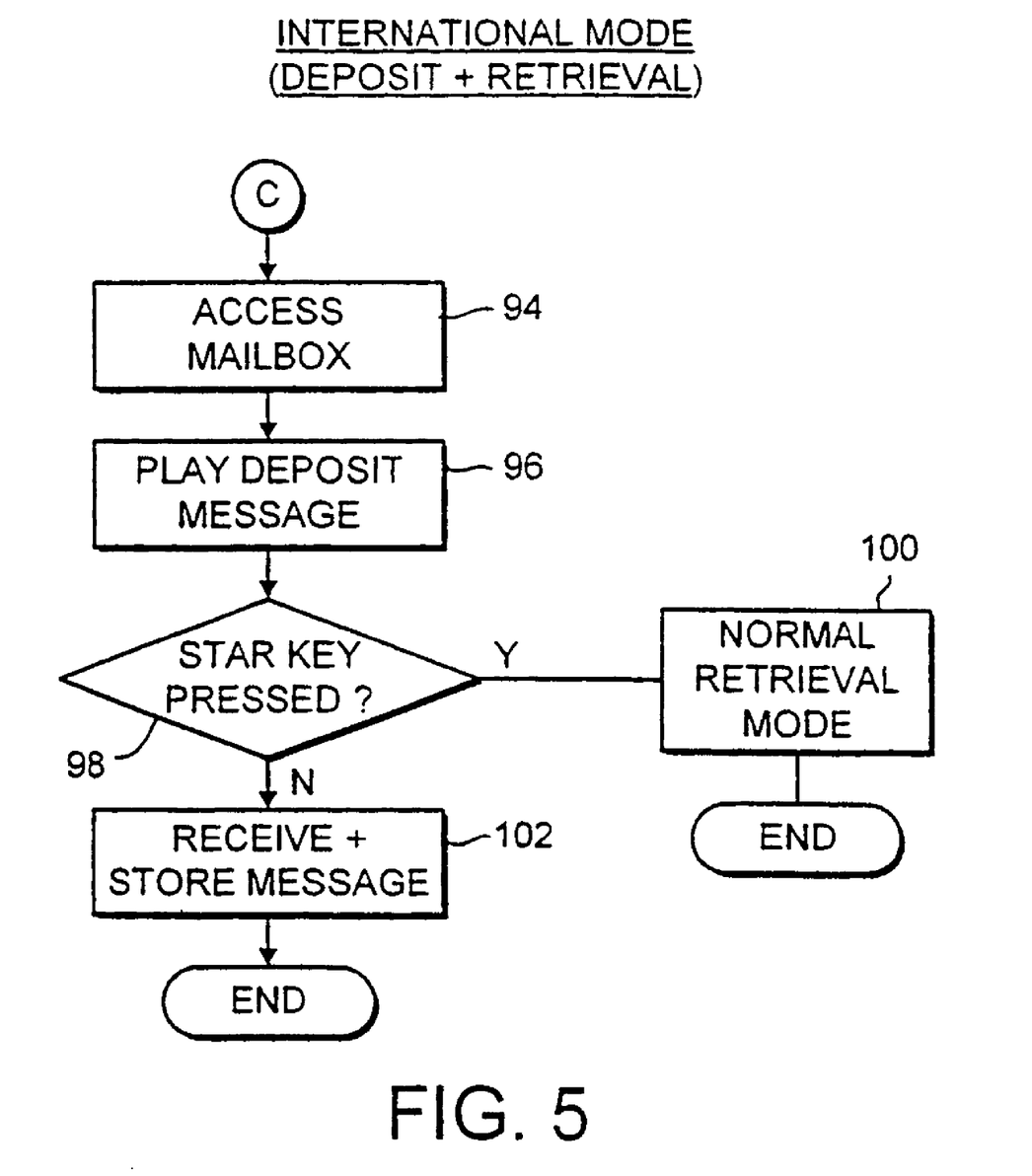
FIG. 5 is a flow diagram showing steps taken by a VPS when in an international mode in accordance with the embodiment of the present invention.

FIG. 5 illustrates the steps taken by the service module in the international mode. The international mode either provides for the deposit of messages for a subscriber by a caller, or for the retrieval of messages by a subscriber. Due to a lack of information in the international signaling, the two cases are distinguished by DTMF input by the subscriber on connection of the call to the answerphone service.

In step 94, a mailbox is accessed by using the mailbox number which previously had to be entered. The service module then plays a personal deposit message by the subscriber in step 96. If during this time the star key of the used telephone is pressed, the service module proceeds to the normal retrieval mode in step 100. Otherwise, the service module receives and stores a message from the caller in step 102.

It should be noted that the present invention is not limited to the embodiment as described hereinabove. In particular, the steps taken by the service module may well be applied in a different order. It is envisaged that various modifications and variations to the above described embodiment could be made, without falling outside the scope of the present invention which is to be determined from the appended claims.

What is claimed is:

1. A system for use in a mobile communications network, the system being adapted to store messages for subsequent retrieval by one of a plurality of subscribers of the mobile communications network, the system comprising:

a plurality of voice processing entities, each assigned to store and playback messages for an allocated set of the plurality of subscribers of the mobile communications network and each being arranged to collect data relating to a message store of a retrieving subscriber which is other than a member of the allocated set of subscribers, the system being in communication with a subscriber location register, said subscriber location register being arranged to store data relating to each of the plurality of subscribers of the mobile communications network, wherein a first voice processing entity of the plurality of voice processing entities is further configured to identify a first subscriber making a first call to retrieve a message by use of an identification signal automatically forwarded to the system during call establishment, the signal identifying the equipment being used by the first subscriber, and wherein the first voice processing entity is further configured to identify a second subscriber making a second call, wherein, in the event that the second subscriber is identified to be other than a member of the set of subscribers allocated to the first voice processing entity, the first voice processing entity forwards the call to the subscriber location register on the basis of the other information supplied by the second subscriber during the call, for connection of the second subscriber to a second voice processing entity associated therewith.

2. The system of claim 1, wherein the system provides at least one mailbox adapted for storing messages for subsequent retrieval by a subscriber, wherein the mailbox is associated with the first subscriber, wherein the system provides access to the mailbox for retrieval of messages on the basis of the identification signal received from the first subscriber, and wherein the system provides access to the mailbox for retrieval of messages on the basis of the other information received by the second subscriber during the second call.

3. The system of claim 2, wherein the mailbox has a handset associated therewith, and wherein the second subscriber is the first subscriber using a handset other than the handset associated with the mailbox.

4. The system of claim 1, wherein the identification signal is a calling line identity (CLI) signal.

5. The system of claim 1, wherein the other information comprises an identifier of the mailbox.

6. The system of claim 1, wherein the request comprises a DTMF tone.

7. The system of claim 1, wherein the other information comprises a DTMF tone.

8. A method of identifying subscribers to a voice processing system in a mobile communications network adapted to store messages for subsequent retrieval by a plurality of subscribers of the mobile communications network, the voice processing system comprising a plurality of voice processing entities, each assigned to store and playback messages for an allocated set of the plurality of subscribers of the mobile communications network and each being arranged to collect data relating to a message store of a retrieving subscriber which is other than a member of the allocated set of subscribers, the system being in communication with a subscriber location register, said subscriber location register being arranged to store data relating each of the plurality of subscribers of the mobile communications network, the method comprising:

monitoring for input of a first type from a handset;

in the absence of the first type of input, identifying, by a selected one of the voice processing entities, a first subscriber making a first call by use of an identification signal automatically forwarded during call establishment, the identification signal being associated with the handset being used by the subscriber; and in response to receipt of the first type of input, identifying, by the selected one of the voice processing entities, a second subscriber making a second call by way of information supplied by the second subscriber during the second call, wherein, in the event that the second subscriber is identified to be other than a member of the set of subscribers allocated to the voice processing entity, the method further comprises forwarding the call to the subscriber location register on the basis of the other information supplied by the second subscriber during the call for connection of the second subscriber to a voice processing entity associated therewith.

9. A message retrieval system in a mobile communications network, the message retrieval system comprising:

a storage module configured to store messages for subsequent retrieval by each of a plurality of subscribers of the mobile communications network; and a service module configured to:

provide a plurality of voice processing entities, each assigned to store and playback messages for an allocated set of the plurality of subscribers of the mobile communications network and each being arranged to collect data relating to a message store of a retrieving subscriber which is other than a member of the allocated set of the plurality of subscribers, the system being in communication with a subscriber location register, said subscriber location register being arranged to store data relating to the retrieving subscriber, wherein a first voice processing entity of the plurality of voice processing entities is configured to identify a first subscriber making a first call to retrieve a message using an identification signal automatically forwarded to the message retrieval system during establishment of the call; and wherein the first voice processing entity is further configured to identify a second subscriber making a second call to retrieve a message, based on additional information provided in a request received from the second subscriber during the second call from the second subscriber, and wherein, in the event that the second subscriber is identified to be other than a member of the set of the plurality of subscribers allocated to said voice processing entity, the service module is further configured to forward the call to the subscriber location register on the basis of the other information supplied by the second subscriber during the call for connection of the second subscriber to a second voice processing entity associated therewith.

10. The message retrieval system of claim 9, wherein the identification signal is associated with the equipment used by the first subscriber in making the first call.

11. The message retrieval system of claim 9, wherein the storage module provides at least one mailbox adapted for storing messages for subsequent retrieval by a subscriber.

12. The message retrieval system of claim 11, wherein the service module is further configured to provide access to the mailbox for retrieval of messages based on an identification signal received from the first subscriber.

13. The message retrieval system of claim 12, wherein the service module is further configured to access the mailbox for retrieval of messages on the basis of the other information received by the second subscriber during the second call.

14. The message retrieval system of claim 13, wherein the mailbox has a handset associated therewith, and wherein the second subscriber is the first subscriber using a handset other than the handset associated with the mailbox.

15. The message retrieval system of claim 9, wherein the identification signal is a calling line identity (CLI) signal.

16. The message retrieval system of claim 9, wherein the other information comprises an identifier of the mailbox.

17. The message retrieval system of claim 9, wherein the request comprises a DTMF tone.

18. The message retrieval system of claim 9, wherein the other information further comprises a DTMF tone.

* * * * *